Sept. 26, 1944.     D. M. SMITH     2,359,007
PISTON PACKING
Filed Aug. 13, 1941
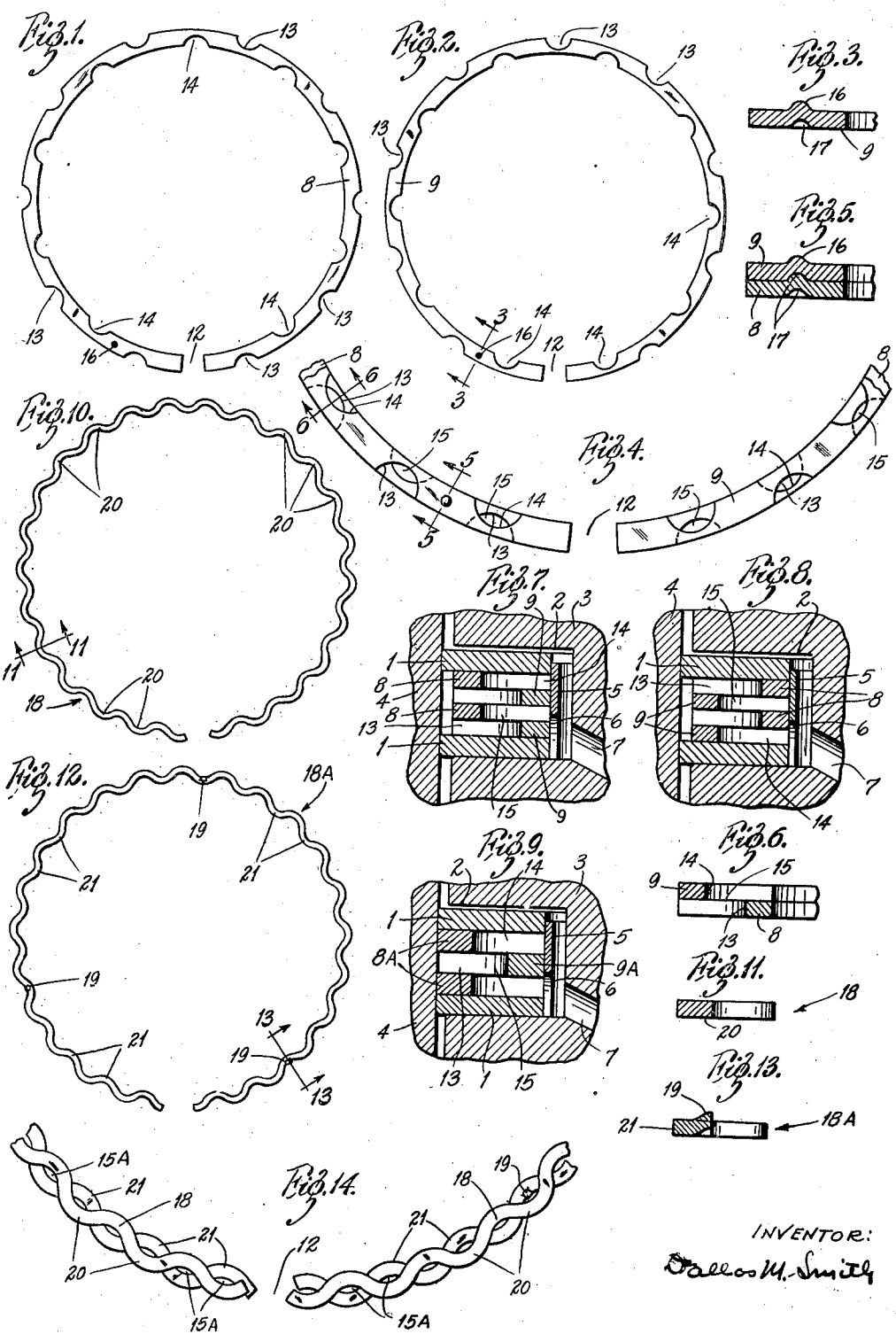
INVENTOR:
Dallas M. Smith Patented Sept. 26, 1944

2,359,007

UNITED STATES PATENT OFFICE 2,359,007

PISTON PACKING

Dallas M. Smith, Kirkwood, Mo.

Application August 13, 1941, Serial No. 406,607

3 Claims. (Cl. 309—45)

My invention relates to piston packings for providing a seal between a piston and a cylinder and more particularly to oil control rings adapted to remove excess oil from the cylinder wall.

An oil control ring constructed according to my invention comprises two or more elements having a substantially circular overall shape, and each element is provided with radial recessions or notches in at least one of its peripheries. The respective elements are arranged so that the radial recessions in the outer periphery of one element overlap the radial recessions in the inner periphery of an adjacent element. This may be accomplished by providing radial recessions in the inner periphery of one element, and in the outer periphery of an adjacent element, or by providing the radial recessions in both peripheries of both elements, and then assembling the respective elements so that the outer recessions in one element overlap the inner recessions in an adjacent element. The elements may be formed of ribbon material, such as hard or soft steel, bronze, cast iron, or any other suitable material, bent flatwise into substantially circular form. Alternatively, the material may be in the form of wire, bent sinuously, and having a substantially circular overall shape. The elements when formed of ribbon material may or may not engage the cylinder wall and are used in combination with ordinary steel ring members common body. When the elements are made of sinuously bent wire they preferably do not engage the cylinder wall and serve only as a ventilated spacer to maintain the ring members in a predetermined position in the ring groove. Circumferential movement of the elements relative to one another preferably is restricted by some suitable expedient.

A piston packing of the kind described briefly above scrapes excess oil from the cylinder wall and allows the oil to drain into the bottom of the ring groove and thence through ports provided in the piston to the hollow interior thereof. The oil scraped from the cylinder wall passes radially through passages formed by the overlapping of recessions formed in the outer face of one element and the inner face of the adjacent element. By forming the oil passages in this manner, none of of the elements need be provided with openings extending from the exterior periphery to the interior periphery thereof.

Having thus briefly described my invention, one object thereof is to provide a piston packing which may be used as an oil control packing.

Another object of my invention is to produce a piston packing which is light in weight and cheap to manufacture.

Another object of my invention is to provide a piston packing which removes excess oil from the cylinder wall and drains the excess oil removed therefrom into the hollow interior of the piston.

A more specific object of my invention is to simplify the manufacturing process of oil rings so that the oil drainage arrangement may be produced more economically than heretofore.

Other objects and advantages will be apparent to those skilled in the art from the following description, wherein reference is made to the drawing which illustrates several embodiments of my invention and wherein like reference numerals designate like parts throughout the several views.

In the drawing

Fig. 1 is a plan view of an element of a piston packing constructed according to my invention.

Fig. 2 is a plan view of a second element therefor.

Fig. 3 is a vertical section on the line 3—3 of Fig. 2, on an enlarged scale.

Fig. 4 is a fragmentary plan view showing on an enlarged scale the elements of Figs. 1 and 2 assembled.

Figs. 5 and 6 are vertical sectional views on the lines 5—5 and 6—6 respectively of Fig. 4, on an enlarged scale.

Fig. 7 is a vertical sectional view of a portion of a piston including a piston packing constructed according to my invention, the view being on a greatly enlarged scale.

Fig. 8 is a view corresponding to Fig. 7, but showing the elements at a section where the notches in the respective elements are arranged oppositely from the section shown in Fig. 7.

Fig. 9 is a view similar to Fig. 7, but showing a modified arrangement.

Fig. 10 is a plan view of another form of element of a piston packing embodying my invention.

Fig. 11 is a vertical section on the line 11—11 of Fig. 10.

Fig. 12 is a plan view of an element similar to that shown in Fig. 10, and provided with spaced projections at predetermined intervals.

Fig. 13 is a vertical section on line 13—13 of Fig. 12.

Fig. 14 is a fragmentary plan view similar to Fig. 4, showing the elements of Figs. 10 and 12 in assembled relation.

Referring to the drawing, and more particularly to Figs. 7, 8, and 9, the piston packings shown each comprise a pair of thin split steel ring members 1 positioned in a ring groove 2 of a piston 3. The ring members are urged radially outwardly toward the cylinder wall 4 by an expander 5 of conventional form and which preferably is provided with vents 6 to permit oil scraped from the cylinder wall by the ring members to drain freely into the bottom of the ring groove 2, and thence through ports 7 in the piston 3 into the hollow interior thereof. In each case, the members 1 are spaced apart by a plurality of elements having oppositely extending radial recessions which overlap, and form passageways for the flow of oil from the cylinder wall to the bottom of the ring groove.

In the embodiment shown in Figs. 7 and 8, the ring members 1 are separated from each other by a plurality of elements 8 and 9. The elements are formed of hard or soft steel, bronze, cast iron, or any other suitable material, preferably in the form of thin ribbon material bent edgewise into substantially circular form and provided with a gap 12 between the ends thereof so that the elements may expand and contract radially in the ring groove 2. The elements have a plurality of notches 13 formed in the outer face thereof and notches 14 formed in the inner face thereof. The notches 13 and 14 are positioned equidistant from each other and are arranged in staggered relation as shown clearly in Figures 1, 2, and 4, so that the elements are not weakened unduly thereby. The elements 8 and 9 of Figures 1 and 2, respectively, are identical, with the exception that the notches 13 and 14, formed respectively in the outer and inner faces thereof, are oppositely arranged with reference to the gaps 12. When the elements are superimposed upon each other with the gaps in registry the notches 13, in the outer face of the element 8, will be in alignment with and overlap the notches 14 in the inner face of the element 9, and conversely the notches 13 in the outer face of the element 9 will be aligned with and overlap the notches 14 in the inner face of the element 8 as shown clearly in Figs. 4, 6, 7, and 8. By arranging the elements in this manner oil drainage passages are provided from the outer face of the packing to the inner face thereof so that oil scraped from the cylinder wall may pass to the bottom of the ring groove 2. To maintain the rings in their same relative positions a projection 16 is pressed from each of the elements and the projection 16 of one element is located in the depression 17 formed in an adjacent element by the projection 16 thus formed. The projection 16 in the element adjacent the ring members 1 may be positioned in the gap between the ends of that ring member.

In the embodiment of Figs. 7 and 8, the elements 8 and 9 shown in Figs. 1 and 2 are arranged alternately between the ring members 1, and two of each of the elements 8 and 9 are used. In this embodiment the elements 8 and 9 merely space the ring members 1 from each other and do not engage the cylinder wall, but preferably have a slightly inward tension so that the members 8 and 9 engage the expander 5. The embodiment of Fig. 9 comprises the ring members 1 and expander 5 and between the ring members 1 are positioned the elements 8A and 9A which are constructed and arranged similarly to the elements 8 and 9 of the embodiment described above and as shown in Figs. 1 and 2 with the exception that the radial dimension of elements 8A and 9A is substantially the same as that of the ring members 1, so that the elements 8A and 9A engage the cylinder wall. Circumferential movement of the elements 8A and 9A relative to one another is restricted in the manner shown in Fig. 5 or by any other suitable means.

The elements 8 and 9, and 8A and 9A may be arranged in the groove 2 with the gaps 12 positioned in registry with each other or they may be arranged with the gaps 12 out of registry. In either event, the projections on the elements are arranged so that the notches in the outer face of one element are in alignment with and overlap the notches in the inner face of another element as shown clearly in Figs. 4, 6, 7, 8, and 9. The notches 13 and 14 preferably are formed and arranged and are of such length that the overall outer circumference of all the elements, when assembled as a unit, is substantially circular in form.

Advantageous results may be accomplished by providing an arrangement wherein all of the inwardly extending recessions are formed in one element, and all of the outwardly extending recessions are formed in a companion element, as this arrangement provides a continuous outer periphery on the first element, it being understood that the respective recessions are arranged in overlapping relation, as hereinbefore described, in connection with the other embodiments.

In the several embodiments described herein, it will be understood that any number of the elements may be employed together, provided at least one such element having external recessions is arranged adjacent at least one element having internal recessions. The respective elements may be arranged so as to accomplish the overlapping of the recessions in a variety of ways. They may be assembled so that the notches 13 and 14 in adjacent elements overlap, or they may be arranged so that two pairs of elements are positioned in registry and the pairs of elements may be arranged so that the notches 13 of one pair overlap the notches 14 of an adjacent pair.

Fig. 10 shows a modified form of spacer element 18 for use with a pair of thin steel ring members 1 and which comprises a piece of flat wire bent sinuously and having a substantially circular overall shape. Fig. 12 illustrates a companion spacer element 18A similar to element 18 but provided at predetermined spaced intervals with projections 19 having the same function as the projections 16 heretofore described. The projections 19 preferably are pressed from the element 18A as shown clearly in Fig. 13, although pins or other forms of projections may be used. A plurality of elements 18 and 18A are positioned side by side between the ring members 1, and the elements are arranged so that inwardly curved portions 20 of element 18 are aligned with outwardly curved portions 21 of element 18A. When thus aligned, the projections 19 on element 18A are located at the inwardly curved portions 20 of element 18. By arranging the elements 18 and 18A in the manner described above, oil may flow freely through the passages 15A formed by the inwardly and outwardly curved portions of the members 18 and 18A. In some instances it may be desirable, particularly where two elements 18 are used with an element 18A in a packing, to permit the projections 19 to protrude from both side faces of element 18A and locate an element 18 at each side thereof so that the tabs 19 of element 18A engage the elements 18 at the inwardly curved portions thereof. All of the elements described above preferably are split to provide a gap 12 between the ends. As in the previously described embodiments two or more elements may be used and they may be arranged in various ways.

Piston packings as described briefly above are light in weight, cheap to manufacture and function as an oil ring in removing excess oil from the cylinder wall and provide adequate drainage therefor.

While I have described several embodiments of my invention it is to be understood that I do not limit myself to the forms and arrangements shown and described because other forms and arrangements may be used also without deviating from the scope of my invention. For instance, the elements need not engage the cylinder wall when they are used merely as a spacer to maintain a pair of ring members in predetermined position in the ring groove of a piston, as shown in Figs. 7 and 8, or the elements may engage the cylinder wall when they are used with one or more steel members as shown in Fig. 9. An expander may or may not be used with the packing, depending on the conditions under which the packing is used.

Circumferential movement of the elements relative to one another may be restricted in any desired manner, as for instance, by pinning the elements together, or any other suitable arrangement may be used. Also, two or more turns of the packing may be joined together at their ends, either by folding the ring back upon itself at the end of each turn, or by forming the ring as two or more continuous turns to provide a helical ring.

What I claim is:

1. An oil ring for pistons, comprising, a pair of members having a substantially circular over-all shape, said members being super-imposed one upon the other, and each provided with staggered radial recessions in their inner and outer peripheries respectively, said members being circumferentially arranged so that oppositely extending recessions overlap.

2. In a piston packing, a plurality of members having a substantially circular over-all shape and having sinuously shaped interior and exterior peripheries, said members being positioned relative to each other so that inwardly curved portions of one member are aligned with outwardly curved portions of another member, and said members being arranged so that circumferential movement of said members relative to one another is restricted.

3. In a piston packing, a plurality of members positioned side by side and having a substantially circular over-all shape, said members each having notches formed alternately in the inner and outer faces thereof in staggered formation, said members being arranged relative to one another so that the notches in the outer face of one member overlap the notches in the inner face of another member, and said members being arranged so that circumferential movement of said members is restricted.

DALLAS M. SMITH.

CERTIFICATE OF CORRECTION.

Patent No. 2,359,007.　　　　　　　　　　　　　　　September 26, 1944.

DALLAS M. SMITH.

It is hereby certified that error appears in the printed specification of the above numbered patent requiring correction as follows: Page 1, first column, line 31, for the word "body" read --today--; and that the said Letters Patent should be read with this correction therein that the same may conform to the record of the case in the Patent Office.

Signed and sealed this 28th day of November, A. D. 1944.

(Seal)

Leslie Frazer
Acting Commissioner of Patents.